(12) United States Patent
Jania et al.

(10) Patent No.: US 8,640,046 B1
(45) Date of Patent: Jan. 28, 2014

(54) JUMP SCROLLING

(71) Applicants: Frank Jania, Oceanside, NY (US);
Gabriel Aaron Cohen, Alameda, CA (US)

(72) Inventors: Frank Jania, Oceanside, NY (US);
Gabriel Aaron Cohen, Alameda, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/658,629

(22) Filed: Oct. 23, 2012

(51) Int. Cl.
*G06F 3/048* (2013.01)

(52) U.S. Cl.
USPC ........... 715/785; 715/781; 715/782; 715/783; 715/784

(58) Field of Classification Search
USPC .................................................. 715/781–787
See application file for complete search history.

(56) References Cited

U.S. PATENT DOCUMENTS

| | | | |
|---|---|---|---|
| 7,786,975 B2 | 8/2010 | Ording et al. | |
| 7,844,915 B2 | 11/2010 | Platzer et al. | |
| 7,934,167 B2 | 4/2011 | Happonen | |
| 7,958,456 B2 | 6/2011 | Ording et al. | |
| 7,975,242 B2 | 7/2011 | Forstall et al. | |
| 2005/0182760 A1* | 8/2005 | Lee et al. | 707/3 |
| 2006/0242607 A1* | 10/2006 | Hudson | 715/863 |
| 2007/0150830 A1 | 6/2007 | Ording et al. | |
| 2008/0134078 A1 | 6/2008 | Han | |
| 2008/0235621 A1* | 9/2008 | Boillot | 715/810 |
| 2008/0240568 A1 | 10/2008 | Tonouchi | |
| 2009/0055771 A1* | 2/2009 | Nurmi | 715/810 |
| 2009/0064031 A1* | 3/2009 | Bull et al. | 715/784 |
| 2009/0228825 A1 | 9/2009 | Van Os et al. | |
| 2010/0134425 A1 | 6/2010 | Storrusten | |
| 2010/0169841 A1* | 7/2010 | Singh | 715/863 |
| 2010/0231612 A1 | 9/2010 | Chaudhri et al. | |
| 2010/0262905 A1 | 10/2010 | Li | |
| 2011/0022985 A1 | 1/2011 | Ording et al. | |
| 2011/0066984 A1 | 3/2011 | Li | |
| 2011/0231796 A1* | 9/2011 | Vigil | 715/810 |
| 2012/0036428 A1* | 2/2012 | Tsuda et al. | 715/252 |
| 2012/0174043 A1* | 7/2012 | Queru | 715/863 |
| 2012/0216154 A1* | 8/2012 | Li | 715/863 |
| 2012/0239397 A1* | 9/2012 | Napper et al. | 704/235 |
| 2013/0024809 A1* | 1/2013 | Voonna | 715/786 |

OTHER PUBLICATIONS

Yang Li, Gesture Search: A Tool for Fast Mobile Data Access, in UIST'10, Oct. 3-6, 2010, New York, New York, USA.*
Zire™, "Handbook for the Palm™ Zire™ 71 Handheld," retrieved at http://www.hpwebos.com/us/support/handbooks/zire71/zire71_hb_ENG.pdf, accessed on Jan. 12, 2012, 270 pp.

* cited by examiner

*Primary Examiner* — Tadeese Hailu
(74) *Attorney, Agent, or Firm* — Shumaker & Sieffert, P.A.

(57) ABSTRACT

Techniques for jumping to a specific location in a list of items displayed at a touch-sensitive display of a computing device may include outputting, for display at the touch-sensitive display, a first sub-portion of a list of items, receiving an indication of a first gesture input entered at the touch-sensitive display, determining a first alphanumeric character based at least in part on the first gesture input, receiving an indication of a second gesture input entered at the touch-sensitive display, determining a second alphanumeric character based at least in part on the second gesture input, and responsive to determining the second alphanumeric character, outputting, for display at the touch-sensitive display, a sub-portion of the list of items that includes one or more entries having a first character that corresponds to the first alphanumeric character and a second character that corresponds to the second alphanumeric character.

18 Claims, 5 Drawing Sheets

JUMP SCROLLING

BACKGROUND

Typically, a user of a computing device utilizing a touch-sensitive display (such as a touchscreen smartphone or tablet), may scroll through a list of items displayed at the touch-sensitive display by performing flicking gestures upwards and/or downwards on the display. However, for very long lists of items, these multiple flicking gestures may be tedious for the user to perform. Furthermore, due to features such as momentum scrolling (implemented in some computing devices to aid the user in more quickly and accurately reaching a desired item) the user may accidentally over-scroll the list of items and thereby overshoot the desired item. Some possible techniques to improve the speed and accuracy of scrolling through a list of items may include an alphabetic index list for quickly jumping to list items having a specified alphabetic character as its first character, or a specialized scrolling widget that jumps through the alphabet. While these techniques may provide faster access to a desired item in a list of items compared to simply scrolling through the list of items, these techniques may still be less accurate and less precise than desired.

SUMMARY

In one example, the disclosure is directed to a method. The method may include outputting, by a computing device and for display at a touch-sensitive display of the computing device, a first sub-portion of a list of items. The method may further include receiving an indication of a first gesture input entered at the touch-sensitive display. The method may further include determining a first alphanumeric character based at least in part on the first gesture input. The method may further include, responsive to determining the first alphanumeric character, outputting, by the computing device and for display at the touch-sensitive display and in place of the first sub-portion of the list of items, a second sub-portion of the list of items that includes one or more entries having a first character that corresponds to the first alphanumeric character. The method may further include, after outputting, by the computing device and for display at the touch-sensitive display, the second sub-portion of the list, receiving an indication of a second gesture input entered at the touch-sensitive display, wherein at least one of the first gesture input and the second gesture input comprises a multi-touch gesture input. The method may further include determining a second alphanumeric character based at least in part on the second gesture. The method may further include comparing a quantity of points of contact in the first gesture input and the second gesture input. The method may further include, responsive to determining that the second gesture input includes a different quantity of points of contact than the first gesture input, outputting, by the computing device and for display at the touch-sensitive display in place of the second sub-portion of the list of items, a third sub-portion of the list of items that includes one or more entries having a first character that corresponds to the first alphanumeric character and a second character that corresponds to the second alphanumeric character.

In another example, the disclosure is directed to a computing device. The computing device may include one or more processors. The computing device may further include a touch-sensitive display configured to display a first sub-portion of a list of items, and further configured to receive a first gesture input. The computing device may further include a query module operable on the one or more processors and configured to determine a first alphanumeric character based at least in part on the first gesture input. Responsive to the query module determining the first alphanumeric character, the touch-sensitive display may be further configured to display, in place of the first sub-portion of the list of items, a second sub-portion of the list of items that includes one or more entries having a first character that corresponds to the first alphanumeric character. After displaying the second sub-portion of the list, the touch-sensitive display may be further configured to receive a second gesture input. The query module may be further configured to determine a second alphanumeric character based at least in part on the second gesture input. Responsive to the query module determining the second alphanumeric character, the touch-sensitive display may be further configured to display, in place of the second sub-portion of the list of items, a third sub-portion of the list of items that includes one or more entries having a first character that corresponds to the first alphanumeric character and a second character that corresponds to the second alphanumeric character. The first gesture input may be received at a first portion of the touch-sensitive display. The first sub-portion of the list of items may be displayed at the first portion of the touch-sensitive display during input of the first gesture input.

In another example, the disclosure is directed to a computer-readable storage medium containing instructions. The instructions, when executed on at least one processor, causes the at least one processor to perform operations. The operations may include outputting, by a computing device and for display at a touch-sensitive display of the computing device, a first sub-portion of a list of items. The operations may further include receiving an indication of a first gesture input entered at the touch-sensitive display. The operations may further include determining a first alphanumeric character based at least in part on the first gesture input. The operations may further include receiving an indication of a second gesture input entered at the touch-sensitive display, wherein the second gesture includes a greater quantity of points of contact than the first gesture input. The operations may further include determining a second alphanumeric character based at least in part on the second gesture input. The operations may further include, responsive to determining the second alphanumeric character, displaying, at the touch-sensitive display in place of the first sub-portion of the list of items, a second sub-portion of the list of items that includes one or more entries having a first character that corresponds to the first alphanumeric character and a second character that corresponds to the second alphanumeric character.

The details of one or more examples of the disclosure are set forth in the accompanying drawings and the description below. Other features, objects, and advantages of the disclosure will be apparent from the description and drawings, and from the claims.

DETAILED DESCRIPTION

In general, aspects of the disclosure are directed to techniques for potentially faster and more accurate jumping to a specific location in a list of items displayed at a touch-sensitive display of a computing device.

Aspects of the present disclosure may provide techniques for a user to potentially more quickly and more accurately jump to a specific location in a list of items displayed at a touch-sensitive display of a computing device by performing gestures on the touch-sensitive display related to alphanumeric characters, such as by drawing or writing alphanumeric characters on the touch-sensitive display, to cause a list of items displayed at the touch-sensitive display to scroll to a specific item in the list of items. The user may cause the computing device to enter a jump scrolling mode. In some examples, the computing device may automatically determine when to enter jump scrolling mode. Once the computing device is in the jump scrolling mode, a user may draw a specific alphanumeric character or perform a gesture associated with the specific alphanumeric character on the touch-sensitive display to cause the list of items to scroll to the first item in the list of items having a first character that corresponds with the specific alphanumeric character drawn by the user.

Furthermore the user may be able to draw a second specific alphanumeric character on the touch-sensitive display to further cause the list of items to scroll to the first item in the list of items having a first character that corresponds with the specific alphanumeric character previously drawn by the user and having a second character that corresponds with the second specific alphanumeric character drawn by the user. The user may continue to draw additional specific alphanumeric characters on the touch-sensitive display to further specify the item in the list of items that should be scrolled to according to the techniques described above.

In some examples, aspects of the present disclosure may provide techniques that employ multi-touch gestures. For example, while the user may use a single finger to perform a single-touch gesture to specify the first alphanumeric character, the user may use two fingers to perform a multi-touch gesture to specify the second alphanumeric character, three fingers to perform a multi-touch gesture to specify the third alphanumeric character, and so on. By employing multi-touch gestures, the user may also be able to more easily correct their input mistakes. For example, the user may perform a single-touch gesture to specify an "S" character and then perform a two-fingered multi-touch gesture to specify an "A" character. If, for example, the user wants to scroll to another item in the list of items that does not start with an "S," then the user may perform another single-touch gesture to specify the item in the list of items to which the user wishes to jump. However, if the user wants to continue to specify "S" as the first character, but would like to replace "A" as the second character, the user may, subsequent to performing the two-fingered multi-touch gesture to specify the "A" character, perform another two-fingered multi-touch gesture to specify a desired character to replace "A," thereby replacing the "A" character with the specified character while retaining "S" as the first character.

In some examples, the user may perform a two-fingered multi-touch gesture to specify the first alphanumeric character, and may perform a single-touch gesture to specify the subsequent alphanumeric characters. In this way, the multi-fingered gesture may signal to the computing device that the user is entering into a jump scroll mode. In some examples, if a list of items is outputted at the display of the computing device, the computing device may, responsive to receiving a multi-touch contact (e.g., a two-fingered contact) at the touchscreen display, both enter the jump scroll mode and exit a regular scroll mode In some examples, while in jump scroll mode, the user may perform gestures to perform actions other than specifying a desired alphanumeric character. For example, the user may perform gestures that may cause the list of items to scroll to the top of the list or to the bottom of the list.

In some examples, the gestures may be performed by a stylus or any other input devices besides a user's finger. For example, a modifier key or graphical control displayed at a touch-sensitive display may be selected when performing a gesture using a stylus in order to perform a multi-touch gesture.

The computing device may be taken out of the jump scroll mode after a specified time of inactivity. Alternatively, the user may interact with the computing device or otherwise manually select an option so that the computing device exits the jump scroll mode.

Figure 1A:
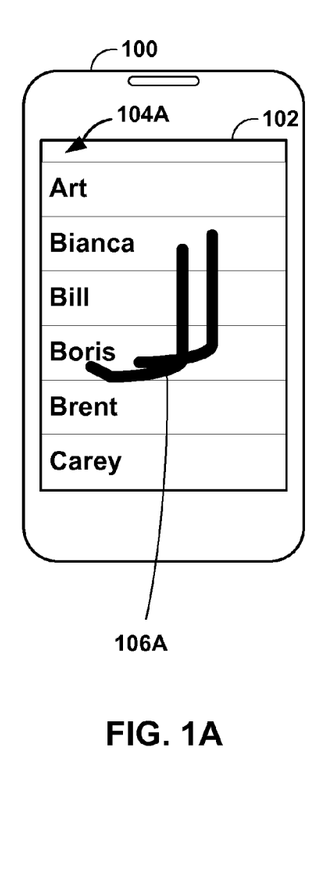
FIGS. 1A-1D are conceptual diagrams illustrating an example list of items displayed by an example computing device scrolling to an example location in the example list of items according to some aspects of the present disclosure.

FIGS. 1A-1D are conceptual diagrams illustrating an example list of items displayed by an example computing device scrolling to an example location in the example list of items according to some aspects of the present disclosure. As shown in FIG. 1A, computing device 100 may include touch-sensitive display 102. Touch-sensitive display 102 may display a sub-portion of a list of items, where touch-sensitive display 102 may be able to display only a portion of the entries in the list of items. Gestures may be detected at touch-sensitive display 102 to scroll the list of items, so that touch-sensitive display 102 may display a different sub-portion of the list of items.

Examples of computing device 100 may include, but are not limited to, portable or mobile computing devices such as mobile phones (including smart phones), laptop computers, personal digital assistants (PDA's), portable gaming devices, portable media players, tablet computers, and e-book readers, as well as desktop computers, set top boxes, gaming systems, televisions, and the like, including a combination of two or more of these items. Computing device 100 may include one or more input devices that receive user input specifying actions to be performed by computing device 100. Touch-sensitive display 102 may be an input device in computing device 100 that generates one or more signals corresponding to a location on or near the touch-sensitive display 102. In some examples, touch-sensitive display 102 may detect a presence of an input unit, e.g., a finger, pen or stylus that may be in close proximity to, but does not physically touch, touch-sensitive display 102. As used herein, user "contact" may therefore refer to close proximity that is detected by touch-sensitive display 102. In other examples, user "contact" may include physical contact with touch-sensitive display 102 to select the corresponding location, e.g., in the case of a touch-sensitive screen. Touch-sensitive display 102, in some examples, may generate a signal corresponding to the location of the input unit. Signals generated by the selection of the corresponding location(s) may then be provided as data to applications and other components of computing device 100.

Computing device 100 may also include one or more output devices that display content to a user of computing device 100. Touch-sensitive display 102 may also be an output device in computing device 100 that displays graphical content responsive to electronic signaling or other directives from computing device 100. Graphical content, generally, may include any visual depiction displayed at touch-sensitive display 102. Examples of graphical content may include images, text, videos, visual objects and/or visual program components such as scroll bars, text boxes, buttons, etc.

Applications being executed on computing device 100 may present a list of items to be displayed at touch-sensitive display 102. For example, a media player application may present a list of songs, a movie show time application may present a list of currently-playing movies, and an address book application may present a list of names. However, if the list of items contains more entries than can be displayed at once at touch-sensitive display 102, touch-sensitive display 102 may only be able to display a portion of the entries in the list of items at once. For example, example touch-sensitive display 102 shown in FIG. 1A may not be able to display more than six entries of a list of items at once. Thus, if a list of items contains more than six entries, then example touch-sensitive display 102 shown in FIG. 1A may only display at once a portion of the entries in the list of items.

A list of items may be presented by an application being executed on computing device 100, and, as shown in FIG. 1A, sub-portion 104A of the list of items may initially be displayed at touch-sensitive display 102. The list of items may, for example, be a list of names, and the list of items may be alphabetized from A to Z. While sub-portion 104A of the list of items is being displayed at touch-sensitive display 102, gesture 106A may be detected at touch-sensitive display 102. As shown in FIG. 1A, gesture 106A may include two points of contact, so that gesture 106A may be a multi-touch gesture. The two points of contact of gesture 106A may be caused, for example, by a user placing two fingers onto touch-sensitive display 102 to draw or perform gesture 106A. In some examples, gesture 106A may include a single point of contact, or may include more than two points of contact.

By being a multi-touch gesture, gesture 106A may signal to computing device 100 to enter a jump scrolling mode, so that one or more gestures detected at touch-sensitive display 102 during the jump scrolling mode may cause the list of items to be jump scrolled to a specified location in the list of items. Alternatively, the jump scrolling mode may be activated manually by interacting with computing device 100, such as by selecting a graphical control displayed at touch-sensitive display 102, or may be activated by any other suitable methods. The jump scrolling mode may also be exited automatically after a certain time has elapsed since detection of a jump scrolling gesture at touch-sensitive display 102, or may be exited by interacting with computing device 100.

Figure 1B:
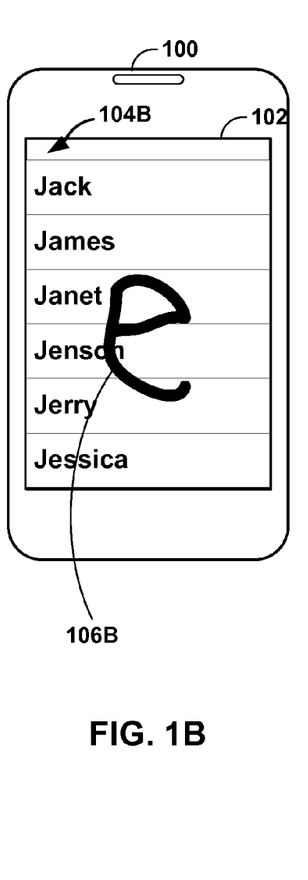
Figure 3A:
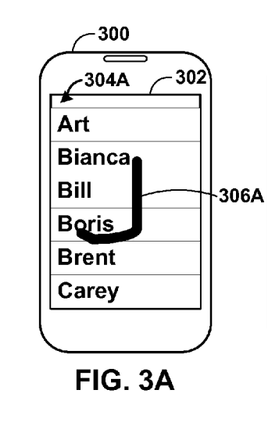
FIGS. 3A-3G are conceptual diagrams illustrating an example list of items displayed by an example computing device scrolling to an example location in the example list of items according to some aspects of the present disclosure.

Gesture 106A may be detected at the same portion of touch-sensitive display 102 as where sub-portion 104A of the list of items is being displayed. As shown in FIG. 3A, gesture 106A may be a handwritten character "j," and may be performed directly over sub-portion 104A of the list of items displayed at touch-sensitive display 102. An alphanumeric character may be determined based at least in part on gesture 106A. For example, if gesture 106A is a handwritten character "j," the alphanumeric character may be determined to be the character "j" based at least in part on gesture 106A. As shown in FIG. 1B, responsive to determining that gesture 106A corresponds to the character "j," the list of items may be jump scrolled so that sub-portion 104B of the list of items may now be displayed at touch-sensitive display 102 instead of sub-portion 104A of the list of items.

Sub-portion 104B of the list of items may include one or more entries that have a first character that corresponds to the alphanumeric character determined based at least in part on gesture 106A. In some examples, sub-portion 104B of the list of items may be a portion of the list of items that includes a first entry that is the first occurrence in the list of items of an entry having a first character that corresponds to the alphanumeric character determined based at least in part on gesture 106A. Because, in this example it has been determined that gesture 106A may correspond to the character "j," sub-portion 104B of the list of items may include one or more entries that have a first character of "j," including a first entry "Jack" in sub-portion 104B of the list of items that is the first occurrence in the list of items of an entry having a first character of "j."

While sub-portion 104B of the list of items is displayed at touch-sensitive display 102, gesture 106B may be detected at touch-sensitive display 102. As shown in FIG. 1B, gesture 106B may have a single point of contact and, thus, may be a single-touch gesture. In some examples, if gesture 106A's multi-touch gesture has already triggered jump scrolling mode in computing device 100, additional single touch gestures such as gesture 106B may be performed during jump scrolling mode at touch-sensitive display 102 to further narrow the sub-portion of the list of items until computing device 100 exits jump scrolling mode. In some examples, gesture 106B may be a multi-touch gesture.

Gesture 106B may be detected at the same portion of touch-sensitive display 102 as where sub-portion 104B of the list of items is being displayed. As shown in FIG. 1B, gesture 106B may be a handwritten character "e."

Figure 1C:
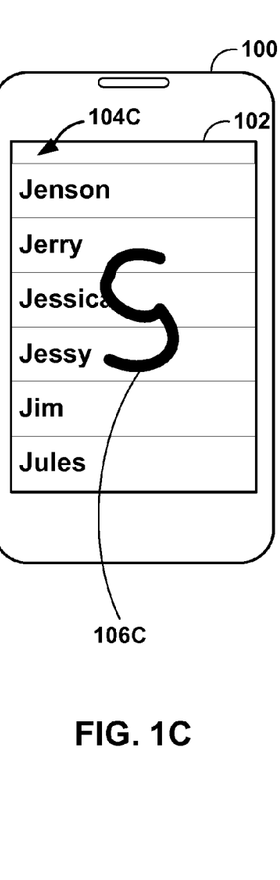

An alphanumeric character may be determined based at least in part on gesture 106B. For example, if gesture 106B is a handwritten character "e," the alphanumeric character may be determined to be the character "e" based on gesture 106B. As shown in FIG. 1C, responsive to determining that gesture 106B corresponds to the character "e," sub-portion 104C of the list of items may be displayed at touch-sensitive display 102.

Sub-portion 104C of the list of items may include one or more entries that have a first character that corresponds to the alphanumeric character determined based at least in part on gesture 106A, and a second character that corresponds to the alphanumeric character based at least in part on gesture 106B. In some examples, sub-portion 104C of the list of items may be a portion of the list of items that includes a first entry that is the first occurrence in the list of items of an entry having a first character that corresponds to the alphanumeric character determined based at least in part on gesture 106A, and a second character that corresponds to the alphanumeric character based at least in part on gesture 106B. Because it has been determined that gesture 106A may correspond to the character "j," and that gesture 106B may correspond to the character "e," sub-portion 104C of the list of items may include one or more entries that have a first character of "j" and a second character of "e," and the first entry "Jenson" in sub-portion 104C of the list of items may be the first occurrence in the list of items of an entry having both a first character of "j" and a second character of "e."

While sub-portion 104C of the list of items is displayed at touch-sensitive display 102, gesture 106C may be detected at touch-sensitive display 102. As shown in FIG. 1C, gesture 106C may have a single point of contact and, thus, may be a single-touch gesture. Because gesture 106A's multi-touch gesture may have already triggered jump scrolling mode in computing device 100, additional single touch gestures such as gesture 106C may be performed at touch-sensitive display 102 to further narrow the sub-portion of the list of items until computing device 100 exits jump scrolling mode. In some examples, gesture 106C may be a multi-touch gesture.

Gesture 106C may be detected at the same portion of touch-sensitive display 102 as where sub-portion 104C of the list of items is being displayed. As shown in FIG. 1C, gesture 106B may be a handwritten character "s."

Figure 1D:
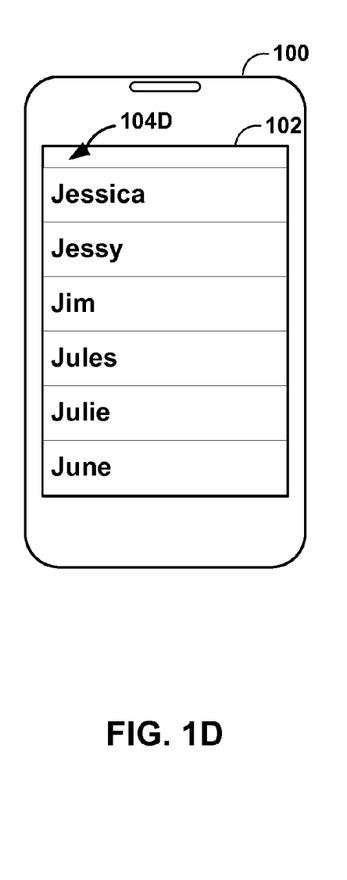

An alphanumeric character may be determined based at least in part on gesture 106C. For example, if gesture 106C is a handwritten character "s," the alphanumeric character may be determined to be the character "s" based on gesture 106C. As shown in FIG. 1D, responsive to determining that gesture 106C corresponds to the character "s," sub-portion 104D of the list of items may be displayed at touch-sensitive display 102.

Sub-portion 104D of the list of items may include one or more entries that have a first character that corresponds to the alphanumeric character determined based at least in part on gesture 106A, a second character that corresponds to the alphanumeric character based at least in part on gesture 106B, and a third character that corresponds to the alphanumeric character based at least in part on gesture 106C. In some examples, sub-portion 104D of the list of items may be a portion of the list of items that includes a first entry that is the first occurrence in the list of items of an entry having a first character that corresponds to the alphanumeric character determined based at least in part on gesture 106A, a second character that corresponds to the alphanumeric character based at least in part on gesture 106B, and a third character that corresponds to the alphanumeric character based at least in part on gesture 106C. Because it has been determined that gesture 106A may correspond to the character "j," that gesture 106B may correspond to the character "e," and that gesture 106C may correspond to the character "s," sub-portion 104D of the list of items may include one or more entries that have a first character of "j," a second character of "e," and a third character of "s," and the first entry "Jessica" in sub-portion 104D of the list of items may be the first occurrence in the list of items of an entry having a first character of "j," a second character of "e," and a third character of "s."

Figure 2:
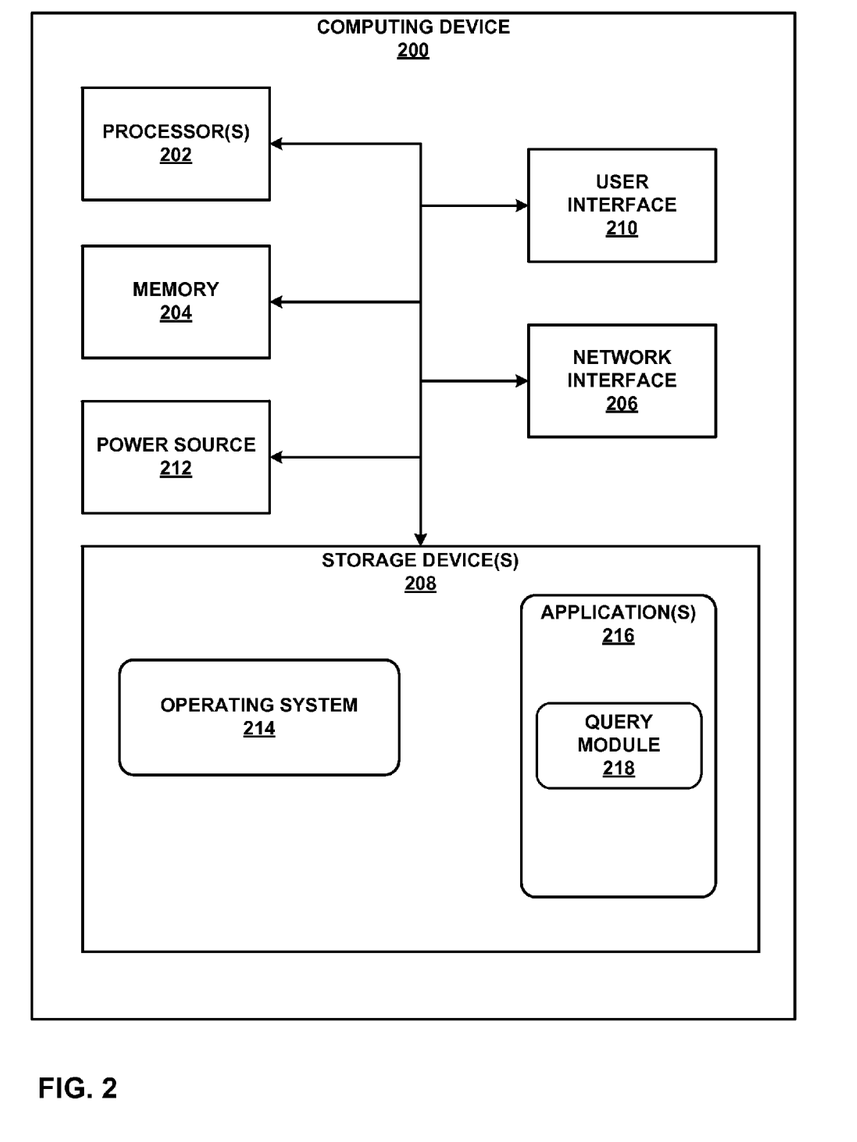
FIG. 2 is a block diagram illustrating an example computing device according to some aspects of the present disclosure.

FIG. 2 is a block diagram illustrating further details of one example of computing device 200, such as computing device 100 shown in FIGS. 1A-1D, according to some aspects of the present disclosure. FIG. 2 illustrates only one particular example of computing device 200. Many other example embodiments of computing device 200 may be used in other instances.

As shown in the specific example of FIG. 2, computing device 200 may include one or more processors 202, memory 204, a network interface 206, one or more storage devices 208, user interface 210, and power source 212. Computing device 200 may also include an operating system 214. Computing device 200, in one example, may further include one or more applications 216, such as query module 218. One or more applications 216 may also be executable by computing device 200. Components of computing device 200 may be interconnected (physically, communicatively, and/or operatively) for inter-component communications.

One or more processors 202, in one example, may implement functionality and/or process instructions for execution within computing device 200. For example, one or more processors 202 may be capable of processing instructions stored in memory 204 and/or instructions stored on one or more storage devices 208.

Memory 204, in one example, may store information within computing device 200 during operation. Memory 204, in some examples, may represent a computer-readable storage medium. In some examples, memory 204 may be a temporary memory, meaning that a primary purpose of memory 204 may not be long-term storage. Memory 204, in some examples, may be described as a volatile memory, meaning that memory 204 may not maintain stored contents when computing device 200 is turned off. Examples of volatile memories may include random access memories (RAM), dynamic random access memories (DRAM), static random access memories (SRAM), and other forms of volatile memories known in the art. In some examples, memory 204 may be used to store program instructions for execution by one or more processors 202. Memory 204, in one example, may be used by software or applications running on computing device 200 (e.g., one or more applications 216) to temporarily store data and/or instructions during program execution.

One or more storage devices 208, in some examples, may also include one or more computer-readable storage media. One or more storage devices 208 may be configured to store larger amounts of information than memory 204. One or more storage devices 208 may further be configured for long-term storage of information. In some examples, one or more storage devices 208 may include non-volatile storage elements. Examples of such non-volatile storage elements may include magnetic hard disks, optical discs, floppy disks, Flash memories, or forms of electrically programmable memories (EPROM) or electrically erasable and programmable (EEPROM) memories.

Computing device 200, in some examples, may also include a network interface 206. Computing device 200, in such examples, may use network interface 206 to communicate with external devices via one or more networks, such as one or more wired or wireless networks. Network interface 206 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 200 may use network interface 206 to wirelessly communicate with an external device such as a server, mobile phone, or other networked computing device.

Computing device 200 may also include user interface 210. User interface 210 may include one or more input devices, such as touch-sensitive display 102 of FIGS. 1A-1D. Input device, in some examples, may be configured to receive input from a user through tactile, electromagnetic, audio, and/or video feedback. Examples of input device may include a touch-sensitive display, mouse, keyboard, voice responsive system, video camera, microphone or any other type of device for detecting gestures by a user. In some examples, a touch-sensitive display may include a presence-sensitive screen.

User interface 210 may also include one or more output devices, such as touch-sensitive display 102 shown in FIGS. 1A-1D. One or more output devices, in some examples, may be configured to provide output to a user using tactile, audio, or video stimuli. One or more output devices, in one example, may include a display, sound card, a video graphics adapter card, or any other type of device for converting a signal into an appropriate form understandable to humans or machines. Additional examples of one or more output device may include a speaker, a cathode ray tube (CRT) monitor, a liquid crystal display (LCD), or any other type of device that can generate intelligible output to a user.

Computing device 200, in some examples, may include power source 212, which may be rechargeable and provide power to computing device 200. Power source 212, in some examples, may be a battery made from nickel-cadmium, lithium-ion, or other suitable material.

Examples of computing device 200 may include operating system 214. Operating system 214 may be stored in one or more storage devices 208 and may control the operation of components of computing device 200. For example, operating system 214 may facilitate the interaction of one or more applications 216 with hardware components of computing device 200.

As shown in FIG. 2, one or more applications 216 may be stored in one or more storage devices 208 and may include query module 218. Query module 218 may include program instructions and/or data that are executable by one or more processors 202 of computing device 200. For example, query module 218 may include instructions that cause one or more applications 216 executing on computing device 200 to perform one or more of the operations and actions described in FIGS. 1A-1D, 3A-3G, 4A-4D, and 5.

In some examples, the query module may be configured to query, via network interface 206, a server device, such as server device 106 of FIGS. 1A-1D. The query module may be further configured to, subsequent to querying, receive instructions via network interface 206 from a server device to re-query the server device at a first specified time. The query module may be further configured to re-query the server device via network interface 206 at the first specified time. The query module may be further configured to, subsequent to re-querying, receive via network interface 206 an address associated with a second computing device at a second specified time.

Any applications, e.g., one or more applications 216, implemented within or executed by computing device 200 may be implemented or contained within, operable by, executed by, and/or be operatively/communicatively coupled to components of computing device 200, e.g., one or more processors 202, memory 204, network interface 206, one or more storage devices 208, and user interface 210.

FIGS. 3A-3G are conceptual diagrams illustrating an example list of items displayed by an example computing device scrolling to an example location in the example list of items according to some aspects of the present disclosure. As shown in FIGS. 3A-3G, computing device 300, similar to computing device 100 shown in FIGS. 1A-1D may include touch-sensitive display 302. Touch-sensitive display 302 may display a sub-portion of a list of items, where touch-sensitive display 302 may be able to display at once only a portion of the entries in the list of items. Gestures may be detected at touch-sensitive display 302 to manipulate the positioning of the list of items, such as by scrolling the list of items, so that touch-sensitive display 302 may display a different sub-portion of the list of items based on the gestures detected at touch-sensitive display 302.

As shown in FIG. 3A, sub-portion 304A of a list of items may be displayed at touch-sensitive display 302. Gesture 306A may be detected at touch-sensitive display 302. Gesture 306A may include a single point of contact and may be a handwritten character "j." The character "j" may be determined based at least in part on gesture 306A.

Figure 3B:
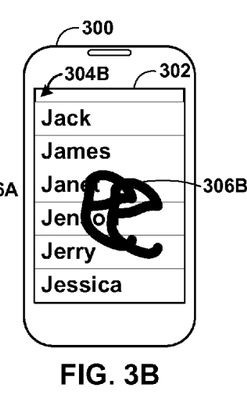

As shown in FIG. 3B, in response to determining that the character "j" has been entered by gesture 306A, sub-portion 304B of the list of items may be displayed at touch-sensitive display 302. Because the character "j" has been determined based at least in part on gesture 306A, sub-portion 304B of the list of items may include one or more entries that have a first character of "j," and the first entry "Jack" in sub-portion 304B of the list of items may be the first entry in the list of items that has a first character of "j."

Subsequent to detecting gesture 306A at touch-sensitive display 302, gesture 306B may be detected at touch-sensitive display 302. Gesture 306B may include two points of contact, which is one more point of contact than gesture 306A. By including one more point of contact than gesture 306A, gesture 306B may indicate that it is specifying a second character that is subsequent to the first character specified by gesture 306A. Gesture 306B may be a handwritten character "e," and the character "e" may be determined based at least in part on gesture 306B.

Figure 3C:
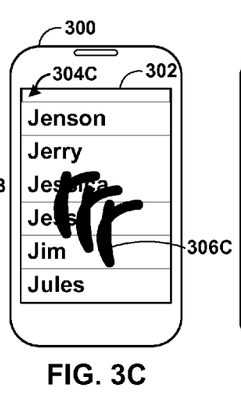

As shown in FIG. 3C, in response to determining that the character "e" has been entered by gesture 306B, sub-portion 304C of the list of items may be displayed at touch-sensitive display 302. Because the character "j" has been determined based at least in part on gesture 306A, and character "e" has been determined based at least in part on gesture 306B, sub-portion 304C of the list of items may include one or more entries that have a first character of "j" and a second character of "e," and the first entry "Jenson" in sub-portion 304C of the list of items may be the first entry in the list of items that has a first character of "j" and a second character of "e."

Subsequent to detecting gesture 306A and gesture 306B at touch-sensitive display 302, gesture 306C may be detected at touch-sensitive display 302. Gesture 306C may include three points of contact, which is one more point of contact than gesture 306B and two more points of contact than gesture 306A. By including one more point of contact than gesture 306B, gesture 306C may indicate that it is specifying a third character that is subsequent to the second character specified by gesture 306B and the first character specified by gesture 306A. Gesture 306C may be a handwritten character "r," and the character "r" may be determined based at least in part on gesture 306C.

Figure 3D:
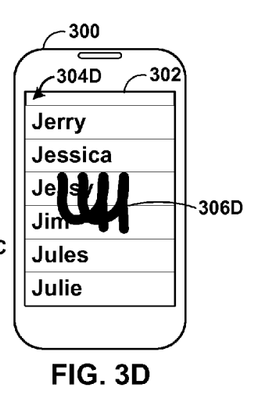

As shown in FIG. 3D, in response to determining that the character "r" has been entered by gesture 306C, sub-portion 304D of the list of items may be displayed at touch-sensitive display 302. Because the character "j" has been determined based at least in part on gesture 306A, character "e" has been determined based at least in part on gesture 306B subsequent to gesture 306A, and the character "r" has been determined based at least in part on gesture 306C subsequent to gesture 306B, sub-portion 304D of the list of items may include one or more entries that have a first character of "j," a second character of "e," and a third character of "r," and the first entry "Jerry" in sub-portion 304D of the list of items may be the first entry in the list of items that has a first character of "j," a second character of "e," and a third character of "r."

In some examples, user of computing device 300 may be able to correct errant gestures performed by the user on touch-sensitive display 302 by performing a new gesture having the same quantity of points of contact as the errant gesture on touch-sensitive display 102. For example, gesture 306B may be an errant gesture that the user would like to correct. Because gesture 306B includes two points of contacts, user may be able to replace gesture 306B by performing a gesture with the same quantity (two) of points of contacts as gesture 306B. As shown in FIG. 3D, gesture 306D may be detected at touch-sensitive display 302, and gesture 306D may include two points of contacts. Thus, gesture 306D may replace gesture 306B, so that the sub-portion of the list of items to be displayed at touch-sensitive display 302 may be determined based at least in part on gesture 306D instead of 306D.

In some examples, gesture 306D may replace gesture 306B as well as gestures detected at touch-sensitive display 302 after gesture 306B that specifies additional alphanumeric characters. For example, gesture 306D may replace both gesture 306B and 306C, so that the sub-portion of the list of items to display at touch-sensitive display 302 may be determined based at least in part on gesture 306A and 306D, but not gesture 306B or gesture 306C.

Figure 3E:
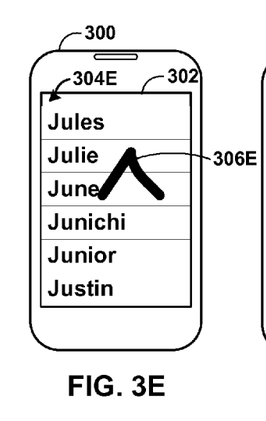

Gesture 306D may be a hand written character "u," and the character "u" may be determined based at least in part on gesture 306D. As shown in FIG. 3E, in response to determining that the character "u" has been entered by gesture 306D, sub-portion 304E of the list of items may be displayed at touch-sensitive display 302. Because the character "j" has been determined based at least in part on gesture 306A, and the character "u" has been determined based at least in part on gesture 306D, and because gesture 306D replaces gesture 306B as well as gestures detected subsequent of gesture 306B, sub-portion 304E of the list of items may include one or more entries that have a first character of "j" and a second letter of "u," and the first entry "Jules" in sub-portion 304E of the list of items may be the first entry in the list of items that has a first character of "j" and a second character of "u."

Figure 3F:
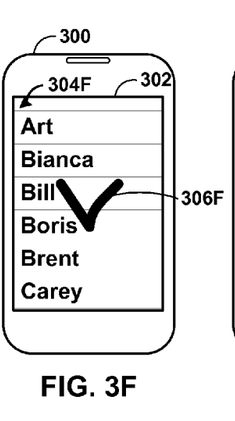
Figure 3G:
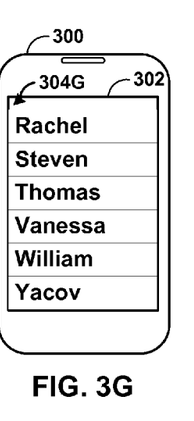

In some examples, the user of computing device 300 may perform gestures on touch-sensitive display 302 that do not specify alphanumeric characters. For example, subsequent to detecting gesture 306D at touch-sensitive display 302, gesture 306E may be detected at touch-sensitive display 302. Gesture 604E may be a gesture that directs computing device 300 to scroll to the top of the list of items. As shown in FIG. 3E, sub-portion 304F of the list of items may contain the first six entries of the list of items, including the first entry of the list of items "Art." Correspondingly, gesture 306F, which may be a gesture that directs computing device 300 to scroll to the bottom of the list of items, may be detected at touch-sensitive display. As shown in FIG. 3G, sub-portion 304G of the list of items may contain the last six entries of the list of items, including the last entry of the list of items "Yacov."

FIGS. 4A-4D are conceptual diagrams illustrating an example list of items displayed by an example computing device scrolling to an example location in the example list of items according to some aspects of the present disclosure. As shown in FIGS. 4A-4D, computing device 400, similar to computing device 100 shown in FIGS. 1A-1C, may include touch-sensitive display 402. Touch-sensitive display 402 may display a sub-portion of a list of items, where touch-sensitive display 402 may be able to display at once only a portion of the entries in the list of items. Gestures may be detected at touch-sensitive display 402 to manipulate the positioning of the list of items, such as by scrolling the list of items, so that touch-sensitive display 402 may display a different sub-portion of the list of items based on the gestures detected at touch-sensitive display 402.

Figure 4A:
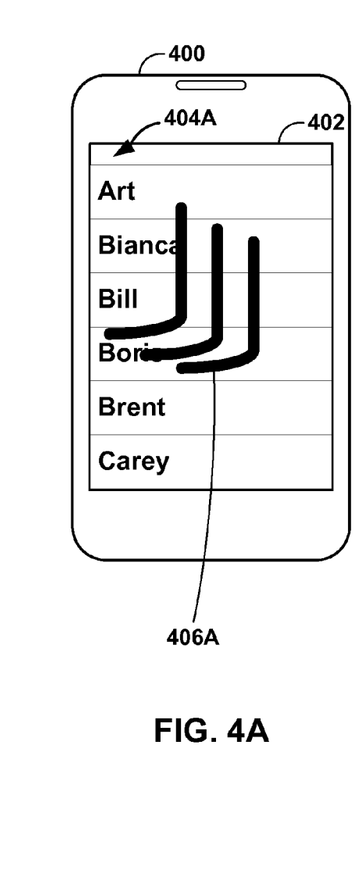
FIGS. 4A-4D are conceptual diagrams illustrating an example list of items displayed by an example computing device scrolling to an example location in the example list of items according to some aspects of the present disclosure.

In some examples, instead of increasing the points of contact for each subsequent gesture, as shown in FIGS. 3A-3G, the points of contact may be decreased for each subsequent gesture. As shown in FIG. 4A, sub-portion 404A of a list of items may be displayed at touch-sensitive display 402. Gesture 406A may be detected at touch-sensitive display 402. Gesture 406A may include three points of contact and may be a handwritten character "j." The character "j" may be determined based at least in part on gesture 406A.

Figure 4B:
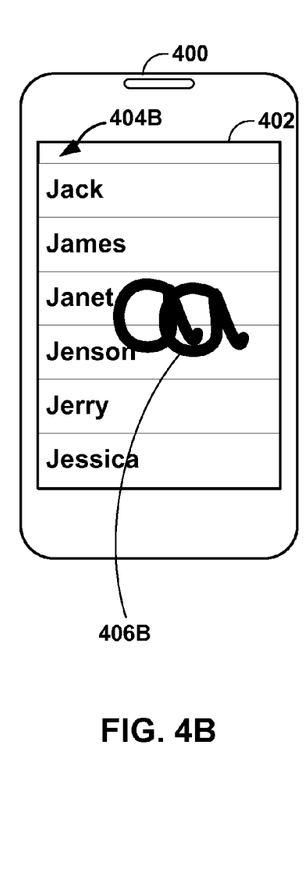

As shown in FIG. 4B, in response to determining that the character "j" has been entered by gesture 406A, sub-portion 404B of the list of items may be displayed at touch-sensitive display 402. Because the character "j" has been determined based at least in part on gesture 406A, sub-portion 404B of the list of items may include one or more entries that have a first character of "j," and the first entry "Jack" in sub-portion 404B of the list of items may be the first entry in the list of items that has a first character of "j."

Subsequent to detecting gesture 406A at touch-sensitive display 402, gesture 406B may be detected at touch-sensitive display 402. Gesture 406B may include two points of contact, which is one fewer point of contact than gesture 406A. By including one fewer point of contact than gesture 406A, gesture 406B may indicate that it is specifying a second character that is subsequent to the first character specified by gesture 406A. Gesture 406B may be a hand written character "a," and the character "a" may be determined based at least in part on gesture 406B.

Figure 4C:
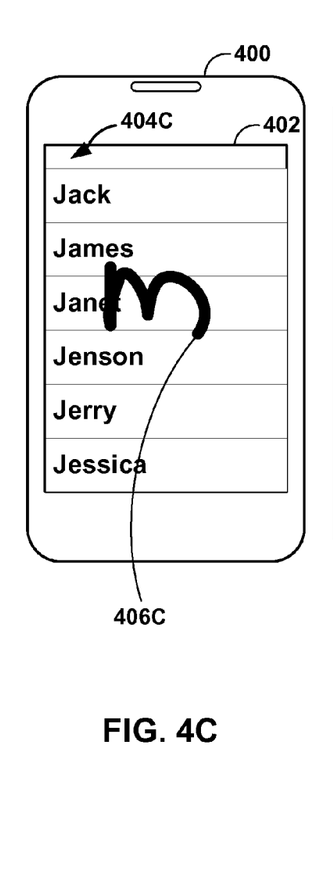

As shown in FIG. 4C, in response to determining that the character "a" has been entered by gesture 406B, sub-portion 404C of the list of items may be displayed at touch-sensitive display 402. Because the character "j" has been determined based at least in part on gesture 406A, and character "a" has been determined based at least in part on gesture 406B, sub-portion 404C of the list of items may include one or more entries that have a first character of "j" and a second character of "a," and the first entry "Jack" in sub-portion 404C of the list of items may be the first entry in the list of items that has a first character of "j" and a second character of "a."

Subsequent to detecting gesture 406A and gesture 406B at touch-sensitive display 402, gesture 406C may be detected at touch-sensitive display 402. Gesture 406C may include a single point of contact, which is one fewer point of contact than gesture 406B and two fewer points of contact than gesture 406A. By including one fewer point of contact than gesture 406B, gesture 406C may indicate that it is specifying a third character that is subsequent to the second character specified by gesture 406B and the first character specified by gesture 406A. Gesture 406C may be a hand written character "m," and the character "m" may be determined based at least in part on gesture 406C.

Figure 4D:
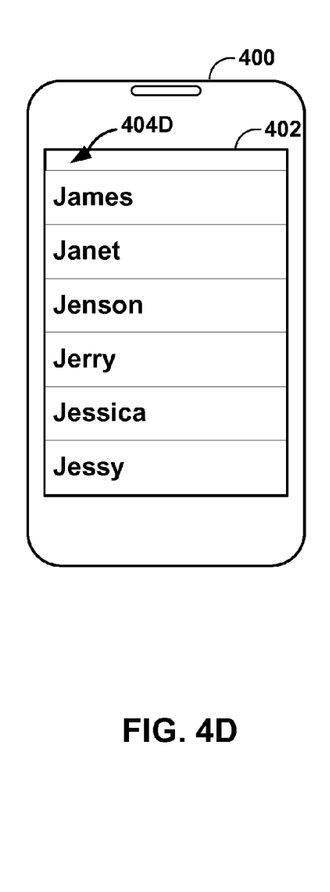

As shown in FIG. 4D, in response to determining that the character "m" has been entered by gesture 406C, sub-portion 404D of the list of items may be displayed at touch-sensitive display 402. Because the character "j" has been determined based at least in part on gesture 406A, character "a" has been determined based at least in part on gesture 406B subsequent to gesture 406A, and the character "m" has been determined based at least in part on gesture 406C subsequent to gesture 406B, sub-portion 404D of the list of items may include one or more entries that have a first character of "j," a second character of "a," and a third character of "m," and the first entry "James" in sub-portion 404D of the list of items may be the first entry in the list of items that has a first character of "j," a second character of "a," and a third character of "m."

Figure 5:
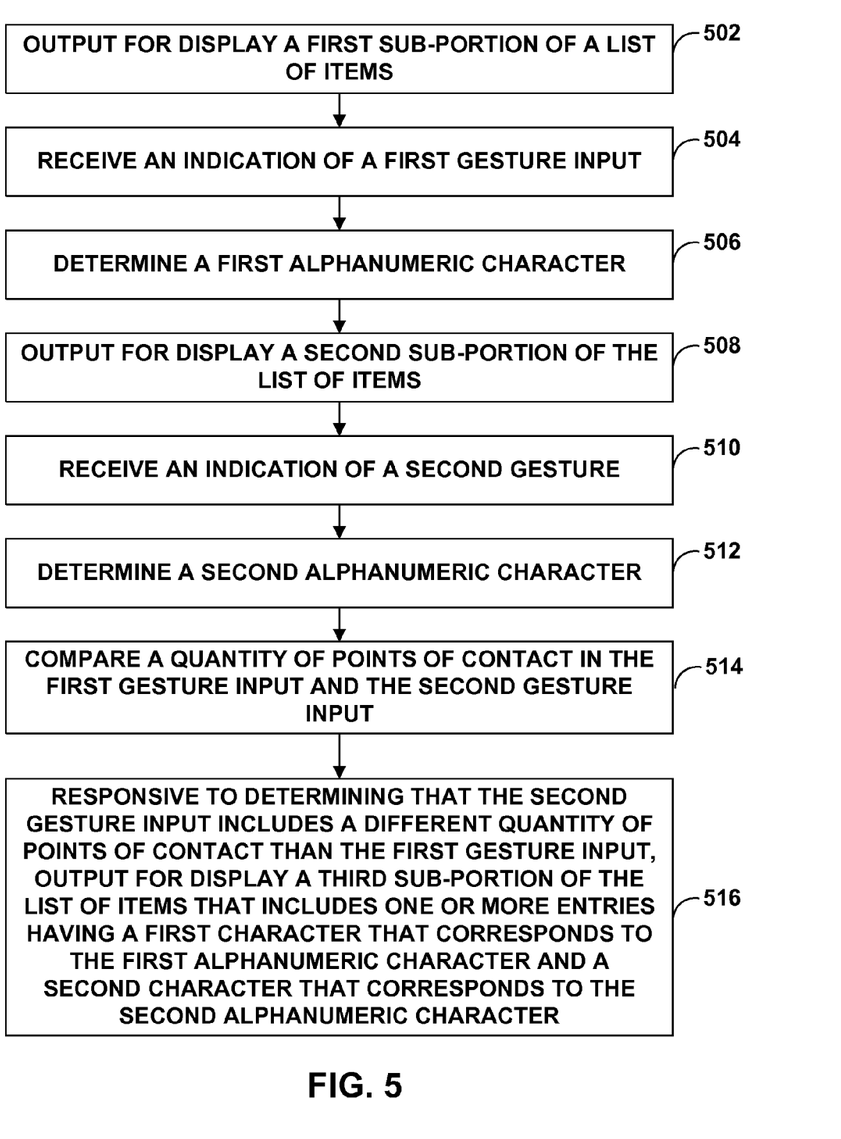
FIG. 5 is a flowchart illustrating an example method for jump scrolling a list of items according to some examples of the present disclosure.

FIG. 5 is a flowchart illustrating an example method for jump scrolling a list of items according to some examples of the present disclosure. The example method illustrated in FIG. 5 may be performed by one or more computing devices, such as one or more of the devices shown in FIGS. 1-4.

As shown in FIG. 5, the method may include outputting, by a computing device and for display at a touch-sensitive display of the computing device, a first sub-portion of a list of items (502). The method may further include receiving an indication of a first gesture input entered at the touch-sensitive display (504). The method may further include determining a first alphanumeric character based at least in part on the first gesture input (506). The method may further include, responsive to determining the first alphanumeric character, outputting, by the computing device and for display at the touch-sensitive display in place of the first sub-portion of the list of items, a second sub-portion of the list of items that includes one or more entries having a first character that corresponds to the first alphanumeric character (508). The method may further include, after outputting, by the computing device and for display at the touch-sensitive display, the second sub-portion of the list, receiving an indication of a second gesture input entered at the touch-sensitive display, wherein at least one of the first gesture input and the second gesture input comprises a multi-touch gesture input (510). The method may further include determining a second alphanumeric character based at least in part on the second gesture (512). The method may further include comparing a quantity of points of contact in the first gesture input and the second gesture input (514). The method may further include, responsive to determining that the second gesture input includes a different quantity of points of contact than the first gesture input, outputting, by the computing device and for display at the touch-sensitive display in place of the second sub-portion of the list of items, a third sub-portion of the list of items that includes one or more entries having a first character that corresponds to the first alphanumeric character and a second character that corresponds to the second alphanumeric character (516).

In some examples, the method may further include, responsive to determining that the second gesture input includes a same quantity of points of contact as the first gesture input, outputting, by the computing device and for display at the touch-sensitive display in place of the second sub-portion of the list of items, a fourth sub-portion of the list of items that include one or more entries having a first character that corresponds to the second alphanumeric character.

In some examples, the method may further include, responsive to the first gesture input including the multi-touch gesture input, entering a jump scrolling mode that jumps to a sub-portion of the list of items based at least in part on determining alphanumeric characters associated with gesture inputs.

In some examples, the first gesture input is received at a first portion of the touch-sensitive display, and the first sub-portion of the list of items is output by the computing device and for display at the first portion of the touch-sensitive display during reception of the first gesture input. The second gesture input is received at a second portion of the touch-sensitive display, and the second sub-portion of the list of items is output by the computing device and for display at the second portion of the touch-sensitive display during reception of the second gesture input.

In some examples, the first gesture input includes a first quantity of points of contact at the touch-sensitive display, the second gesture input includes a second quantity of points of contact at the touch-sensitive display, and the first quantity is different from the second quantity. In some examples, the first gesture input comprises the multi-touch gesture input and the second gesture input comprises a single-touch gesture. In some examples, the first gesture input includes a greater quantity of points of contact than the second gesture input. In some examples, the second gesture input includes a greater quantity of points of contact than the first gesture input.

In some examples, the method may further include after outputting, by the computing device and for display at the touch-sensitive display, the third sub-portion of the list, receiving an indication of a third gesture input entered at the touch-sensitive display, the third gesture input including the first quantity of points of contact. In some examples, the method may further include determining a third alphanumeric character based at least in part on the third gesture input. In some examples, the method may further include responsive to determining the third alphanumeric character, outputting, by the computing device and for display at the touch-sensitive display, a fourth sub-portion of the list of items that includes one or more entries having a first character that corresponds to the third alphanumeric character.

In some examples, the method may further include after outputting, by the computing device and for display at the touch-sensitive display, the third sub-portion of the list, detecting a third gesture input entered at the touch-sensitive display, the third gesture input including the second quantity of points of contact. In some examples, the method may further include determining a third alphanumeric character based at least in part on the third gesture input. In some examples, the method may further include responsive to determining the third alphanumeric character, outputting, by the computing device and for display at the touch-sensitive display, a fifth sub-portion of the list of items that includes one or more entries having a first character that corresponds to the first alphanumeric character and a second character that corresponds to the third alphanumeric character.

In some examples, the method may further include after outputting, by the computing device and for display at the touch-sensitive display, the third sub-portion of the list, receiving an indication of a third gesture input entered at the touch-sensitive display. In some examples, the method may further include determining a third alphanumeric character based at least in part on the third gesture input. In some examples, the method may further include responsive to determining the third alphanumeric character, outputting, by the computing device and for display at the touch-sensitive display, a fifth sub-portion of the list of items that includes one or more entries having a first character that corresponds to the first alphanumeric character, a second character that corresponds to the second alphanumeric character, and a third character that corresponds to the third alphanumeric character.

In some examples the first gesture input comprises a multi-touch gesture input, the second gesture input comprises a single-touch gesture input, and the third gesture input comprises the single-touch gesture input. In some examples, the second gesture input includes a great quantity of points of contact than the first gesture input, and the third gesture input includes a greater quantity of points of contact than the second gesture input. In some examples, the first gesture input includes a great quantity of points of contact than the second gesture input, and the second gesture input includes a greater quantity of points of contact than the third gesture input.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

As used throughout this disclosure, headings are included to improve the clarity of the disclosure and are not used to define separate examples. In some examples, features of various examples may be combined and/or used from among multiple headings.

Various embodiments have been described. These and other embodiments are within the scope of the following claims.

The invention claimed is:

1. A method comprising:
outputting, by a computing device, for display at a touch-sensitive display, a first sub-portion of a list of items;
receiving an indication of a first gesture input entered at the touch-sensitive display, the first gesture input having a first quantity of points of contact at the touch-sensitive display;
determining a first alphanumeric character based at least in part on the first gesture input;
responsive to determining the first alphanumeric character, outputting, by the computing device, for display at the touch-sensitive display, and in place of the first sub-portion of the list of items, a second sub-portion of the list of items that includes one or more entries having a first character that corresponds to the first alphanumeric character;
after outputting, by the computing device, for display at the touch-sensitive display, the second sub-portion of the list of items, receiving an indication of a second gesture input entered at the touch-sensitive display, the second gesture input having a second quantity of points of contact at the touch-sensitive display, wherein at least one of the first gesture input and the second gesture input comprises a multi-touch gesture input;
determining a second alphanumeric character based at least in part on the second gesture input;
comparing the first quantity of points of contact in the first gesture input to the second quantity of points of contact in the second gesture input; and
responsive to determining that the first quantity of points of contact is different than the second quantity of points of contact, outputting, by the computing device and for display at the touch-sensitive display, in place of the second sub-portion of the list of items, a third sub-portion of the list of items that includes one or more entries having a first character that corresponds to the first alphanumeric character and a second character that corresponds to the second alphanumeric character.

2. The method of claim 1, wherein:
responsive to the first gesture input including the multi-touch gesture input, entering a jump scrolling mode that jumps to a sub-portion of the list of items based at least in part on determining alphanumeric characters associated with gesture inputs.

3. The method of claim 2, wherein:
the first gesture input is inputted at a first portion of the touch-sensitive display, and
the first sub-portion of the list of items is output by the computing device and for display at the first portion of the touch-sensitive display during input of the first gesture input.

4. The method of claim 3, wherein:
the second gesture input is inputted at a second portion of the touch-sensitive display; and
the second sub-portion of the list of items is output by the computing device and for display at the second portion of the touch-sensitive display during input of the second gesture input.

5. The method of claim 1, wherein:
the first quantity of points of contact is different from the second quantity of points of contact.

6. The method of claim 5, wherein:
the first gesture input comprises the multi-touch gesture input; and
the second gesture input comprises a single-touch gesture input.

7. The method of claim 5, wherein:
the first quantity of points of contact is greater than the second quantity of points of contact.

8. The method of claim 5, wherein:
the second quantity of points of contact is greater than the first quantity of points of contact.

9. The method of claim 5, further comprising:
after outputting, by the computing device and for display at the touch-sensitive display, the third sub-portion of the list, receiving an indication of a third gesture input entered at the touch-sensitive display, the third gesture input including the first quantity of points of contact;
determining a third alphanumeric character based at least in part on the third gesture input; and
responsive to determining the third alphanumeric character, outputting, by the computing device and for display at the touch-sensitive display, a fourth sub-portion of the list of items that includes one or more entries having a first character that corresponds to the third alphanumeric character.

10. The method of claim 5, further comprising:
after outputting, by the computing device, for display at the touch-sensitive display, the third sub-portion of the list, receiving an indication of a third gesture input entered at the touch-sensitive display, the third gesture input including the second quantity of points of contact;

determining a third alphanumeric character based at least in part on the third gesture input; and responsive to determining the third alphanumeric character, outputting, by the computing device, for display at the touch-sensitive display, a fourth sub-portion of the list of items that includes one or more entries having a first character that corresponds to the first alphanumeric character and a second character that corresponds to the third alphanumeric character.

11. The method of claim 1, further comprising:

after outputting, by the computing device, for display at the touch-sensitive display, the third sub-portion of the list, receiving an indication of a third gesture input entered at the touch-sensitive display;

determining a third alphanumeric character based at least in part on the third gesture input; and responsive to determining the third alphanumeric character, outputting, by the computing device, for display at the touch-sensitive display, a fourth sub-portion of the list of items that includes one or more entries having a first character that corresponds to the first alphanumeric character, a second character that corresponds to the second alphanumeric character, and a third character that corresponds to the third alphanumeric character.

12. The method of claim 11, wherein:

the first gesture input comprises the multi-touch gesture input;

the second gesture input comprises a single-touch gesture input; and the third gesture input comprises the single-touch gesture input.

13. The method of claim 11, wherein:

the second quantity of points of contact is greater than the first quantity of points of contact; and the third gesture input includes a third quantity of points of contact that is greater than the second quantity of points of contact.

14. The method of claim 11, wherein:

the third gesture input includes a third quantity of points of contact at the touch-sensitive display;

the first quantity of points of contact is great than the second quantity of points of contact; and the second quantity of points of contact is greater than the third quantity of points of contact.

15. A computer-readable storage medium comprising instructions that, when executed by at least one processor, cause the at least one processor to perform operations comprising:

outputting, by a computing device, for display at a touch-sensitive display, a first sub-portion of a list of items;

receiving an indication of a first gesture input entered at the touch-sensitive display, the first gesture input having a first quantity of points of contact at the touch-sensitive display;

determining a first alphanumeric character based at least in part on the first gesture input;

receiving an indication of a second gesture input entered at the touch-sensitive display, the second gesture input having a second quantity of points of contact at the touch-sensitive display, wherein the second quantity of points of contact is greater than the first quantity of points of contact;

determining a second alphanumeric character based at least in part on the second gesture input; and responsive to determining the second alphanumeric character, outputting, by the computing device, for display at the touch-sensitive display, in place of the first sub-portion of the list of items, a second sub-portion of the list of items that includes one or more entries having a first character that corresponds to the first alphanumeric character and a second character that corresponds to the second alphanumeric character.

16. The computer-readable storage medium of claim 15, wherein:

an indication of the first gesture input is received at a first portion of the touch-sensitive display; and the first sub-portion of the list of items is outputted by the computing device and for display at the first portion of the touch-sensitive display during input of the first gesture input.

17. A computing device comprising:

one or more processors;

a touch-sensitive display configured to display a first sub-portion of a list of items, and further configured to receive a first gesture input;

a query module operable on the one or more processors and configured to determine a first alphanumeric character based at least in part on the first gesture input;

wherein responsive to the query module determining the first alphanumeric character, the touch-sensitive display is further configured to display, in place of the first sub-portion of the list of items, a second sub-portion of the list of items that includes one or more entries having a first character that corresponds to the first alphanumeric character;

wherein after displaying the second sub-portion of the list, the touch-sensitive display is further configured to receive a second gesture input, wherein at least one of the first gesture input and the second gesture input comprises a multi-touch gesture input;

wherein the query module is further configured to determine a second alphanumeric character based at least in part on the second gesture input;

wherein responsive to the query module determining the second alphanumeric character, the touch-sensitive display is further configured to display, in place of the second sub-portion of the list of items, a third sub-portion of the list of items that includes one or more entries having a first character that corresponds to the first alphanumeric character and a second character that corresponds to the second alphanumeric character;

wherein the first gesture input is received at a first portion of the touch-sensitive display; and wherein the first sub-portion of the list of items is displayed at the first portion of the touch-sensitive display during input of the first gesture input.

18. The computing device of claim 17, wherein:

the first gesture input comprises a first quantity of points of contact at the touch-sensitive display;

the second gesture input comprises a second quantity of points of contact at the touch-sensitive display; and the first quantity of points of contact is different from the second quantity of points of contact.

* * * * *